United States Patent [19]

Sawhill

[11] Patent Number: 4,643,908

[45] Date of Patent: Feb. 17, 1987

[54] SOFT, MOIST PET FOOD

[75] Inventor: J. Wallace Sawhill, Canoga Park, Calif.

[73] Assignee: Pacific Kenyon Corp., Long Beach, Calif.

[21] Appl. No.: 622,277

[22] Filed: Jun. 19, 1984

[51] Int. Cl.$^4$ ............................................. A23K 1/00
[52] U.S. Cl. .................... 426/630; 426/635; 426/656; 426/657; 426/658; 426/805
[58] Field of Search .................. 426/2, 630, 635, 656, 426/805, 807, 658, 657

[56] References Cited

U.S. PATENT DOCUMENTS

| | | | |
|---|---|---|---|
| 155,517 | 9/1874 | Huch | 426/807 X |
| 3,862,336 | 1/1975 | Kofsky et al. | 426/1 |
| 3,982,003 | 9/1976 | Mitchell et al. | 426/805 X |
| 4,160,041 | 7/1979 | Schroeder et al. | 426/807 X |
| 4,221,818 | 9/1980 | Schroeder | 426/807 |
| 4,284,652 | 8/1981 | Christensen | 426/805 X |
| 4,348,418 | 9/1982 | Smith et al. | 426/805 X |
| 4,358,468 | 11/1982 | Dolan et al. | 426/635 |
| 4,431,675 | 2/1984 | Schroeder et al. | 426/807 |

FOREIGN PATENT DOCUMENTS

| | | | |
|---|---|---|---|
| 106543 | 6/1974 | German Democratic Rep. | 426/98 |
| 1356954 | 6/1974 | United Kingdom | 426/807 |
| 1555008 | 11/1979 | United Kingdom | 426/807 |

OTHER PUBLICATIONS

Grosso et al, "Calcium Chloride in Liquid Feed Supplements", NFIA Counter 1973, pp. 115–129.

*Primary Examiner*—R. B. Penland

[57] ABSTRACT

There is disclosed a new soft, moist pet food and a method for its manufacture. The pet food has a high moisture content, 25 to 50 weight percent, and contains two major nutrient ingredients which are: a protein source, such as a meat meal; and a sugar, each of which is used in an amount from 12 to about 35 weight percent on a dry weight basis. The pet food is prepared by mixing the protein source with an aqueous alkaline ingredient and the sugar to obtain a viscous, intimately admixed sol. The sol is then neutralized to a mildly acidic pH value and the resulting mixture is poured into containers in which it solidifies in a period of several hours, reaching most of its ultimate firmness in approximately 24 hours.

26 Claims, No Drawings

SOFT, MOIST PET FOOD

BACKGROUND OF THE INVENTION

1. FIELD OF INVENTION

This invention relates to pet foods and, in particular, to soft, moist pet foods.

2. BRIEF STATEMENT OF THE PRIOR ART

Pet foods are commonly cooked and extruded mixtures of various food sources including meat meals and other byproducts of the meat, poultry and fish industries. These products have been gelled into solids by various techniques. One technique, widely practiced, is to employ a substantial quantity of farinaceous or amylaceous ingredient, typically a flour or ground cereal product which supplies starch that is gelled by the cooking process. Gelatin has also been used to solidify food products, however, the comparatively high cost of this gelling agent has resulted in attempts to use inexpensive substitutes such as the use of algin extracts as discussed in U.S. Pat. No. 3,862,336.

Unfortunately, pets do not favor cereal products and, in particular, cooked starchy products. The pet food formulators have consequently directed most of their efforts towards attempts to impart a meat-like appearance to these cooked cereal products to satisfy the purchaser and have attempted to include sufficient quantities of meat byproducts and flavoring agents to reach an acceptable palatability of the product to pets.

Some of the pet foods have included highly water soluble ingredients, typically sugars, to reduce the water activity of the product and thereby achieve a product that is resistant to bacterial growth. Additionally, antimycotic agents have been included to inhibit yeast and mold growth on the product. Generally, these products are also formulated with a mildly acidic pH value, again to inhibit bacterial action and ensure stability.

BRIEF STATEMENT OF THE INVENTION

This invention is a new, soft, moist pet food having a moisture content from 25 to about 50 weight percent, sugar and a protein source, in approximately equal proportions, each from 12 to about 35 weight percent, on a dry matter basis, and various antimycotic agents or preservatives, flavoring agents, vitamins, pharmaceuticals, minerals, etc., all as desired by the formulator to tailor the pet food to a particular application for a pet species and/or physical disorder.

The invention includes a method for the manufacture of this pet food in which a protein source is mixed with an aqueous alkaline earth metal hydroxide, preferably calcium hydroxide, in the presence of a sufficient quantity of sugar to control the viscosity of the mixture and form a stable sol with a syrup-like consistency. Thereafter an acid, preferably phosphoric acid, is added to neutralize the alkaline ingredient and reduce the pH of the mixture to an acidic value, e.g., pH values from about 3.0 to 6. The resultant mixture solidifies within approximately ½ to 4 hours of its preparation and achieves approximately 80 percent of its ultimate firmness within 24 hours of its preparation.

The pet food product is a soft and moist solid having a firmness and texture which is entirely controllable by minor variations in the method or ingredients, e.g., variations in moisture content. Since the method does not require cooking, it achieves a significant energy savings over prior art techniques. The formulations and the preparation method are extremely tolerant to variations, providing the formulator with great freedom to add many ingredients such as pharmaceuticals which are sensitive to elevated cooking temperatures. Since the appearance of the product can be varied at will, the formulator has complete freedom to simulate the appearance of other foods such as cheeses, meat or fish, by use of coloring and flavoring additives and by variations in the moisture content of the product to obtain the desired firmness. Since the food product, prior to solidification, is a stable, viscous sol, fibers can also be included as desired to provide bulk and texture to the finished product.

DESCRIPTION OF PREFERRED EMBODIMENTS

This invention relates to a soft and moist pet food. The pet food is a composition with a moisture content from 25 to 50 weight percent, preferably from 32 to 45 weight percent.

One major ingredient of the pet food is a protein source which can be from a plant source, e.g., soy meal or cottonseed meal; or a meat meal product such as animal, poultry, fish or yeast meal.

The other major ingredient of the pet food is a sugar and can be sucrose, glucose, lactose, galactose, or mixtures thereof. As with the protein source, suitable sugar sources include byproducts of other industries; e.g. molasses, whey, lignin sulfonates, etc.

The aforementioned major ingredients are used in approximately equal proportions in amounts, each from 12 to about 35 weight percent dry basis, preferably from about 18 to about 30 weight percent.

The soft and moist pet food of the invention has the ingredients and the proportions of ingredients which are set forth in the following table:

TABLE 1

| Ingredient | Proportions, Weight Percent | |
|---|---|---|
| | Broad | Preferred |
| Water | 25–50 | 35–45 |
| Protein Source | 12–35 | 18–30 |
| Sugar (dry weight) | 12–35 | 18–30 |
| Alkali (as metal) | 0.5–3 | 1–2 |
| Mineral Acid[1] | 0.5–3 | 1–2 |

[1]expressed as the acid anhydride

In addition, various optional ingredients can be included such as indicated in the following supplemental table:

TABLE 2

| Ingredient | Proportions, Weight Percent | |
|---|---|---|
| | Broad | Preferred |
| Preservatives | 0.3–10 | 5–8 |
| Fibers | 0.1–2.5 | 0.1–1.0 |
| Minerals | 0–3 | 0.1–2 |
| Vitamins | 0–3 | 0.1–2 |
| Drugs | 0–3 | 0.05–2 |

THE PROTEIN INGREDIENT

The protein ingredient is a natural protein and can be from a wide variety of sources. The protein ingredient can be from a plant source such as soy meal, cottonseed meal, corn gluten meal, grape pomice, etc. Of these plant sources, soy meal and cottonseed meal are preferred. The protein source should not contain any significant quantities of starch, since the starch does not contribute to solidification under the conditions of manufacture of the soft and moist product and also because starch is not palatable to most pets. It is, therefore, preferred to use protein sources containing less than 5 percent starch, most preferably less than 2 percent starch.

The natural protein sources can also be from an animal source such as a meat meal, blood meal, poultry meal, fish meal, or yeast meal. The meat meal can be any of the various commercially available ground and dried animal meal products from the various meat rendering plants, typically chicken, beef or pork meal. The protein meal ingredient may also be a fish meal obtained from the various fish packing plants, a poultry meal from poultry packing plants, or yeast meal which is the by-product of the various fermentation industries in which the yeast cells are separated as a concentrate and are spray dried into an edible powder.

An advantage of the invention is that the protein ingredients can be obtained from a wide variety of sources, including many sources which have not been used to any significant amounts in commercial pet foods. This flexibility permits the formulator to select the most economical protein source, or combination of sources, that will provide the desired aminoacid profile for the pet food. Some protein sources, e.g., grape pomice, blood meal, etc., will not contribute to solidification adequately to obtain the desired firmness. This can be quickly detected by the formulator in a small laboratory batch preparation of the soft and moist pet food, which is a recommended procedure to be followed whenever a new or untested protein or sugar source is to be used. In the event the protein source fails to provide the desired firmness, it can still be used, however, by including from 0.5 to about 5 weight percent gelatin in the protein source. Preferably the amount of gelatin is limited, because of its cost, to an amount from 0.75 to about 3 weight percent. Suitable gelatin sources for this purpose include commercial, food grade gelatins and gelatin-based glues such as hoof and horn glues, etc.

THE SUGAR INGREDIENT

The sugar can be employed in a dry or crystalline condition or can be an aqueous syrup having a sugar concentration of from 50 to about 95, preferably from 70 to about 80, weight percent. The sugar used can be lactose, sucrose, fructose, glucose, or maltose, depending on the particular application and price or availability of a particular sugar. Examples of various, well-established sources of these sugars are: malt syrup, hydrolyzed corn starch, hydrol (syrup from glucose manufacturing operations), raw and refined cane and beet sugars, etc.

A readily available sugar source which can be used is whey, a by-product of the dairy industry. The whey is dilute solution of lactoalbumin, lactose, some fats, and the soluble inorganics from the parent milk. This whey solution is condensed and spray dried to a powder or is condensed to about 40 to 50 percent solids and preserved. A typical analysis is as follows:

TABLE 3

| | |
|---|---|
| Protein | 12.0% |
| Fat | 0.7% |
| Lactose | 60.0% |
| Phosphorous | 0.79% |
| Calcium | 0.87% |

TABLE 3-continued

| | |
|---|---|
| Ash | 9.7% |

The whey syrup can be enzymatically inverted to glucose and galactose and used in the product instead of whey syrup.

Another source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:

Ammonium lignin sulfonate;
Sodium lignin sulfonate; and
Magnesium lignin sulfonate.

A typical analysis of a commercially available ammonium lignin sulfonate solution is as follows:

TABLE 4

| Typical Analysis of Ammonium Lignin Sulfonate | |
|---|---|
| Percent solids | 50% |
| Specific gravity | 1.237 |
| pH, 10% solution | 3.5 |
| Sugars-expressed as glucose | 16.0% |
| Tannin content | 45.0% |
| Available ammonia | 3.0% |
| Sulfur | 6.0% |
| Ash | 1.0% |

THE ACID INGREDIENT

The acid ingredient is phosphoric acid, or a low molecular weight alkanoic acid, e.g., acetic acid, propionic acid, valeric acid, etc. Phosphoric acid is preferred and any available food-grade water soluble phosphoric acid can be used. Useful acids include electric furnace (white) phosphoric acid, or deflorinated wet-process (green) phosphoric acid, which can be of any commercially available grade such as the commonly available concentration range of from 50 to about 55 weight percent expressed as $P_2O_5$ corresponding to a concentration of orthophosphoric acid of about 70–75 weight percent. Acids of higher concentrations such as polyphosphoric acid which is an equilibrated mixture of chiefly pyrophosphoric, tripolyphosphoric and orthophosphoric acid can also be used.

THE PRESERVATIVE INGREDIENT

The preservatives which can be used include any of the food grade additives which exhibit anti-bacterical or anti-fungicidal activity. Generally these are referred to as antimycotic additives and include low molecular weight glycols, e.g., propylene glycol, ethylene glycol, etc.; and alkali metal salts of benzoic acid, sorbic acid, propionic acid, etc. Examples of suitable antimycotic additives are propylene glycol, potassium sorbate, potassium benzoate, and mixtures thereof, particularly mixtures of propylene glycol and potassium sorbate, which exhibit excellent antimycotic activity.

THE FIBER INGREDIENT

The preferred fiber to impart a texture to the pet food is cellulose. Cellulose fibers which are used should be discrete fibers which will readily disperse into the pet food before it is gelled into a solid. Wood and paper pulp are excellent sources of suitable cellulose fibers. Useful materials can include paper pulp from repulped waste paper, however, some purification of this crude product is necessary to remove potentially objectionable or hazardous impurities from paper sizing additives, printing inks and the like. A preferred source of discrete cellulose fibers is unbleached Kraft process wood pulp which comprises decomposed wood fibers of lengths from about 1/16 to ½ inch, usually about ¼ inch. These fibers are available in sheets formed by pressing and dehydrating the pulp. The sheets can be readily formed into fragments which will quickly disperse into discrete fibers when mixed into an aqueous liquid such as the sugar solutions.

Other useful sources of cellulose fibers include the various pulp products of the pulp and paper industry. These include: dissolving and special alpha grades, sulfite paper grades, sulfate paper grades, soda pulp, groundwood pulp, and semichemical pulp. These sources are named after the manufacturing process by which they are prepared. Sulfite, sulfate (Kraft) and soda pulps are derived by chemical treatment of wood to solubilize and remove lignins with, respectively, sulfurous acid, sodium hydroxide and sulfide, and sodium hydroxide, alone. Groundwood pulp is produced by mechanical pulping of wood while semichemical pulp is prepared by chemically pretreating wood chips before mechanical pulping.

Unbleached wood pulp is preferred since there is no necessity to refine the pulp by bleaching, which is commonly used for paper stocks, to remove residual quantities of lignins and colored degradation products. The bleached pulp will, however, function entirely satisfactorly and may be used if its greater cost is not objectionable.

Other pulp sources include pulp prepared from non-wood raw materials such as cotton, linen, manila, cotton linters, hemp, flax, jute, ceral straws, bamboo, esparto and bagasse. These raw materials, however, require processing and purification to obtain a suitable source of cellulose pulp that will provide discrete cellulose fibers which can be readily dispersed into the sugar solutions. Pulps from these sources are not readily available in countries having a healthy forest industry, such as the United States, and are therefore less preferred sources of cellulose fibers for use in the invention.

The aforementioned pulps are usually available as "market pulp" in the form of large bales or as pressed and partially dehydrated sheets and either form is suited for use in the invention.

VITAMINS AND MINERALS INGREDIENTS

The content of minerals, phosphorous and calcium, as well as other ingredients such as drugs, vitamins, etc., can be varied as desired for specific applications. Examples of various minerals are manganese, iodine, zinc, copper, cobalt and iron compounds. Examples of vitamins include Vitamin A, Vitamin B complex, Vitamin D, and Vitamin E.

THE DRUG INGREDIENT

One of the useful features of the pet food of the invention is that it can serve as a very palatable carrier for drugs and medication to correct pet disorders and diseases. The particular concentration of the drug in the pet food can be selected to provide a daily dosage of the drug in a bite size particle, thereby avoiding the necessity to weigh or measure the quantity of pet food administered to the pet. Alternatively, the concentration can be preselected to provide a daily complete ration for the pet, i.e., a preweighed portion of the pet food can be packaged in a single container and the drug can be contained in this preweighed portion in a sufficient concentration to provide the necessary daily dosage of the drug. This, also, avoids the necessity to weigh out a prescribed quantity of the medicated pet food at the feeding time.

Examples of useful drugs are listed in the following paragraphs:

Antibiotics

Ampicillin; Cephalexin; Chloramphenicol; Lincomycin; Lincomycin hydrochloride monohydrate; Oxytetracycline; Penicillin G, sodium or potassium; Procaine penicillin G; Tetracycline; Tylosin.

Sulfonamides

Salicylazosulfapyridine ("Azulfidine"); Sulfadimethoxine; Trimethorprim-sulfadiazine ("Tribrissen").

Corticosteroids/Anti-inflammatory Agents

Corticotropin (ACTH); Cortisone acetate (suspension or tablets); Deoxycorticosterone acetate (DOCA); Dexamethoasone (tablets or suspension); Hydrocortisone acetate (tablets or suspension); Phenylbutazone; Prednisolone.

Hormones/Mediators

Mibolerone ("Cheque"); Progesterone; L-Thyroxin ($T_4$, tetraiodothyronine).

Anthelmintics

Aracoline acetarsol (tablets); Arecoline hydrobromide; Bephenium embonate (or hydroxynaphthoate); Bunamidine hydrochloride; Diethylcarbamazine citrate; Dichlorophen; Disophenol; Hexylresorcinol; Mebendazole; Niclosamide; Piperazine salts.

Central Nervous System Drugs

Barbiturates

Barbituric acid, phenobarbital sodium, thiopental sodium.

Stimulants

Amphetamin, dextroamphetamine.

Anticonvulsants

Diphenylhydantoin, phenobarbital.

Tranquilizers

Acepromazine maleate; Chlorpromazine; Meperidine hydrochloride; Meprobamate.

Automatic Nervous System Drugs

Norpinephrin, epinephrin, isoproternol, ephedrine, atropine, methscopolamine.

Antihistaminics

Chlorpheniramine maleate; Tripelennamine.

Miscellaneous Additives

Amphetamine sulfate; Bethanechol chloride; Cyclophosphamide; Mitotane (o,p' DDD); D-Penicillamine tablets.

Urinary System Agents

Mercaptomerin, chlormerodrin, acetazolamide, cyclothiazide, chlorothiazide.

Gastrointestinal Agents

Meperidine, Darbazine.

Cardiovascular Agents

Digoxin, quinidine, procainamide, lidocaine, aminophylline.

THE METHOD

The proteinaceous meal and the sugar are admixed with an alkaline earth metal hydroxide, preferably calcium oxide or hydroxide, and are blended together for a short period of time, e.g., sufficient to initiate a gelling reaction. Calcium oxide or hydroxide are preferred since these provide maximum firmness to the finished product. It is preferred to introduce the alkaline earth metal reagents as calcium oxide (lime), or magnesium oxide (magnesia), and thereby obtain their heats of hydration to provide a mild preheating of the ingredients during the formulation. The alkaline earth metal oxide or hydroxide is employed in sufficient quantities to achieve an alkaline pH value, typically from about 9.5 to 11.5, preferably from 10.5 to 11, in the aqueous ingredient mixture. This quantity is from about 1 to about 3.5 weight percent, preferably from about 1.5 to 2.5 weight percent, expressed as the metal oxide.

The mixture of sugar and proteinaceous meal ingredients is blended with the aqueous oxide or hydroxide for a period from about 3 to about 30 minutes, typically from about 3 to about 10 minutes, sufficient to achieve a significant thickening of the reactants. The thickening period can be monitored as desired by withdrawing samples and observing their viscosity or flow characteristics. When practicing a batch method, a convenient technique for monitoring the change in viscosity, however, is simply to monitor the torque on the agitating mechanism, typically an electric or hydraulically driven propeller immersed in the ingredient mixing tank. Various instruments are available for this purpose such as instruments to measure the electrical power to an electrical drive, hydraulic pressure to a hydraulic drive, or strain gauges on the propeller drive shaft.

In the preferred batch method, the ingredients are blended and reacted in a mix tank, typically a cylindrical stainless steel tank which, preferably, has a conical bottom with a cone angle from 30 to about 60 degrees (sidewall angle) to facilitate complete draining of the tank contents. The tank is provided with a centrally positioned propeller-type mixer having one or more propellers positioned along the length of a central propeller drive shaft. Each propeller is composed of a plurality of radial blades, e.g., from 3 to about 6 radial blades, which preferably have an axial pitch to induce top to bottom mixing. Preferably, the propeller shaft includes a radial or helical wiper blade at its lower extremity which drags on the inside sidewall of the conical bottom of the tank for complete removal of the tank contents. If desired, the sidewalls of the tank can support one or more stater baffles which are stationary radial plates positioned above or below the propeller blades.

The ingredients can be preweighed or premeasured and the measured quantities can be introduced into the mix tank, or, if desired, the mix tank can include a scale so that the weight of its contents can be constantly monitored and used to control the introduction of the ingredients in a precise fashion.

The batch process is practiced by adding the predetermined quantity of water to the mix tank and introducing the hydroxide. In the preferred method, powdered lime is added to the water and stirred for a sufficient period of time, typically from about 3 to about 10 minutes, to effect hydration of the lime to calcium hydroxide. This hydration is exothermic and preheats the aqueous hydroxide to a slightly elevated temperature, typically from about 95 to about 135 degrees F. Although the entire process can be conducted at ambient temperatures, the preferred technique of achieving a mild preheat from the lime hydration exotherm makes the remainder of the process smoother and more controllable.

The porteinaceous meal product is typically obtained in a dried, powder form and preferably is added to the batch process in this condition. The sugar is available in both the dried powder or crystalline form, or as a syrup solution, depending on the particular sugar and its availability. It can be added to the batch process in either condition, however, when used as a syrup, the water charged initially to the mix tank is adjusted for the water content of the syrup which is to be used.

After the proteinaceous meal and sugar have been added, the crude mixture is stirred with sufficient agitation to ensure intimate dispersion and mixing of the ingredients. The resultant mixture begins to thicken almost immediately upon the addition of these ingredients and this thickening phenomena is monitored to ensure that the liquid remains in a pourable condition during its residence in the mix tank. Typically, the mixing is continued to achieve a viscosity of the crude product from about 2,000 to about 8,000 centipoise seconds, Brookfield viscosometer, preferably from about 4,000 to about 6,000 centipoise seconds.

When the crude product has attained the desired viscosity or thickness, it is neutralized by the addition of an acid, preferably phosphoric acid. Phosphoric acid is preferred, particularly in combination with the alkaline earth metal hydroxide since the resultant neutralization contributes to the overall gelling mechanism and achieves maximum firmness of the final product. The acid is added in a sufficient quantity to reduce the pH of the crude mixture to mildly acidic conditions, pH values from 3.0 to 6.5. The final pH is dependent on the sugar used. Lactose sets at a pH of around 4 and sucrose sets at a pH around 6, and the other sugars set at pH values between the aforementioned values. Usually the quantity of phosphoric acid required is from about 1.5 to about 6, preferably about 2 to 4, weight percent expressed as $H_3PO_4$. The phosphoric acid is commonly available at a commercial strength of about 60 to 90 weight percent orthophosphoric acid and is added in this condition. Again the amount of water initially charged to the mix tank is adjusted to reflect the amount of water which is added with the phosphoric acid.

The various optional ingredients such as antimycotic agents, vitamins, minerals, fiber, other preservatives, pharmaceuticals, etc. can be incorporated in the mixture at any point during its preparation. Since there is no need to heat the ingredients, only mildly elevated temperatures will be experienced from various exothermic reactions. These temperatures are far below the temperatures necessary in competitive processes such as those requiring heating of starch ingredients to a gelling temperature. Consequently, the optional ingredients can be added at any point in the preparation without consideration for any high temperature instability of these ingredients. Preferably, the optional ingredients are added to the mix tank simultaneous with the addition of the proteinaceous meal and sugar, or during the brief period when these ingredients are agitated during the thickening portion of the method.

When the optional ingredient is sensitive to an alkaline pH, such as some pharmaceuticals, its addition is, of course, delayed until the crude reactants have been neutralized by the acid ingredient.

Immediately upon acidification, the crude product can be discharged from the mix tank into various containers for forming it into the desired commercial product. Since the crude product is at ambient or only mildly elevated (80°-110° F.) temperatures, it can be poured directly into the ultimate package or shipping container. If desired, the shipping container can be partitioned into a number of subdivided cells to provide individual bricks or servings of predetermined quantities. This is particularly useful in achieving the treatment dosage desired for pharmaceuticals since each brick can be of a preselected size and pharmaceutical concentration to provide the necessary daily dosage of pharmaceutical for the pet.

Alternatively, the product can be formed into subdivided, small chunks or particles, particularly when it is desired to simulate meat chunks. This can be achieved by pouring the mixture into a slab or ribbon, permitting the ribbon to solidify and reach a suitable firmness for subsequent cutting into chunks. Usually this firmness will be achieved within a period of from 10 to about 24 hours.

The method can also be practiced in a continuous fashion, particularly when manufacturing a standard formula requiring little or no variation in ingredients. The batch process is ideally suited for custom formulating products of varied texture and ingredients, while a continuous process is better suited to the manufacture of a standard, staple diet for pets. The continuous method can be practiced by preparing the various ingredients in the form of syrups or aqueous suspensions and introducing these blended ingredients into a line mixer and passing the resultant blend through a static mixer. Static mixers are commercially available process units which are elongated tubes having a plurality of evenly spaced helical blades or flights which are discontinuous and are mounted in the tube with the adjacent blades or flights disposed at opposite helical angles so that the suspension or mixture passing through the mixture is repeatedly reversed or tumbled as it flows through the mixer.

In practicing this method continuously, the aqueous hydroxide solution can be introduced into a flowing stream in which the predetermined quantities of the proteinaceous meal have been dispersed or suspended in a sugar syrup together with any of the various other optional ingredients and the resultant mixture is then passed through a static mixer of sufficient length to achieve the desired residence time for the product to reach the aforementioned viscosities. Shortly prior to exiting from the static mixer, phosphoric acid can be injected into the static mixer through a side entry and the crude product can be discharged from the static mixer into the shipping container, e.g., plastic or multilayer paper bags, cardboard containers, etc. Alternatively, where a chunk-style product is desired, the product can be discharged onto a moving belt conveyor or bucket conveyor in which the product is confined for a period of from 1 to about 10 hours, until it reaches a sufficient firmness for subsequent handling and processing.

The product is thermoplastic to permit extrusion of the product into strands at an elevated temperature, e.g., 120 to about 180 F., followed by quenching or cooling of the extruded product to ambient temperature. This produces a strand product similar in appearance to ground hamburger. The simulation of hamburger can be enhanced by dividing the product into two portions, adding white and red pigments or dyes to prepare simulated lean meat (red) and fat (white) portions. These portions can then be blended together in the extruder which will disperse the white portion through the red portion and simulate the appearance of fat tissue. For this purpose, the red portion is used in greater proportions, e.g., from about 70 to 95 percent red, and 5 to 30 percent white, portions.

The invention will now be described with reference to the following examples which will serve to illustrate the practice of the invention and results attainable thereby:

EXAMPLE 1

A soft, moist pet food is prepared in a laboratory mixer of 2 liter capacity equipped with a turbine mixer.

The pet food is prepared using a varied proportion of water, propylene glycol and acid in a series of experiments, and the resultant products are inspected for viscosity at the time for pouring into molds and for hardness 24 hours after manufacture.

The following formulations are prepared:

TABLE 5

| Ingredient | A | B |
| --- | --- | --- |
| Water | 320 ml | 240 ml |
| Glycol | 0 | 80 gm |
| Lime* (hydrated) 25% | 80 gm | 80 gm |
| Chicken Meal | 250 gm | 250 gm |
| Dried Whey | 250 gm | 250 gm |
| Potassium Sorbate | 2 gm | 2 gm |
| Phosphoric Acid (75%) | 40 gm | 40 gm |
| Total | 942 gm | 942 gm |

*The lime is hydrated in three volumes of water prior to addition to the ingredients.

After the last ingredient is added, each mixture is stirred and its pH is determined, and adjusted to 6.0. The viscosity of the product is determined and a 200 gram portion is poured into a plastic film bag which is placed in a 250 milliliter beaker.

Sixteen grams of water are added to the remainder of each mixture, which is stirred and its viscosity determined and a second 200 gram sample is removed and similarly packaged. Twelve grams of water are added to the remainder of each mixture, which is stirred, its viscosity is determined and a third 200 gram sample is removed and packaged. Eight grams of water are added to the last remainder of each mixture, the mixture is stirred, its viscosity is measured and then packaged.

The entire procedure is then repeated, adjusting the product to a pH value of 5.0 and another set of four samples is obtained, and then is repeated again adjusting the pH value to 4.0 and a third set of four samples is obtained.

The viscosities are rated on a scale of 0-10, on the following criteria:

TABLE 6

| | |
|---|---|
| 0 | solid |
| 1 | semi-solid |
| 2 | very thick liquid |
| 3 | just pourable |
| 10 | water-like |

After 24 hours, each sample is removed and its hardness is measured. The hardness is determined by a durometer calibrated in a scale where a rating of 50 is a soft pliable solid and 100 is too hard to indent with one's fingernail.

The following results of viscosities and hardness are obtained:

TABLE 7

| | Viscosities (8% glycol) | | |
|---|---|---|---|
| pH Value | 6 | 5 | 4 |
| 32% water | 1 | 1 | 0 |
| 34% water | 0 | 2 | 0 |
| 36% water | 2 | 2 | 1 |
| 38% water | 2 | 2 | 1 |

TABLE 8

| | Viscosities (no glycol) | | |
|---|---|---|---|
| pH Value | 6 | 5 | 4 |
| 32% water | 1 | 1 | 0 |
| 34% water | 2 | 2 | 1 |
| 36% water | 2 | 2 | 2 |
| 38% water | 3 | 3 | 2 |

TABLE 9

| | Hardness (8% glycol) | | |
|---|---|---|---|
| pH Value | 6 | 5 | 4 |
| 32% water | 80 | 84 | 98 |
| 34% water | 78 | 82 | 92 |
| 36% water | 68 | 73 | 96 |
| 38% water | 84 | 68 | 92 |

TABLE 10

| | Hardness (no glycol) | | |
|---|---|---|---|
| pH Value | 6 | 5 | 4 |
| 32% water | 72 | 70 | 87 |
| 34% water | 57 | 60 | 78 |
| 36% water | 48 | 57 | 68 |
| 38% water | 48 | 52 | 62 |

The results indicated that glycol and acidity increases the hardness of the products, and that an increase in water content decreases the viscosity and improves the pour properties of the products.

EXAMPLE 2

The soft, moist pet food is prepared in another set of samples in which the amounts of lime, chicken meal, and invert whey syrup are varied in a series of experiments. The following formulations are prepared:

TABLE 11

| Ingredient | 2-1 | 2-2 | 2-3 | 2-4 | 2-5 | 2-6 | 2-7 | 2-8 |
|---|---|---|---|---|---|---|---|---|
| Water | 240 | 225 | 170 | 185 | 200 | 185 | 120 | 105 |
| Glycol | 70 | 70 | 70 | 70 | 70 | 70 | 70 | 70 |
| Lime (dry) 100% | 16 | 22 | 16 | 22 | 16 | 22 | 16 | 22 |
| Chicken Meal | 240 | 240 | 240 | 240 | 280 | 280 | 280 | 280 |
| Invert Whey (50% Solid) | 400 | 400 | 480 | 480 | 400 | 400 | 480 | 480 |
| Potassium Sorbate | 3 | 3 | 3 | 3 | 3 | 3 | 3 | 3 |
| Phosphoric Acid | 45 | 55 | 45 | 55 | 45 | 55 | 45 | 55 |

After preparation the pH value of each product is adjusted to 5.6, 5.0, 4.4 and 3.9 in successive adjustments. The viscosity of the product is determined and a 200 gram sample is packaged in a plastic film bag and placed in a 250 milliliter beaker after each pH adjustment.

The following results of viscosities and hardnesses are obtained:

TABLE 12

| Sample No. | Viscosity | | | | Hardness | | | |
|---|---|---|---|---|---|---|---|---|
| pH value | 5.6 | 5.0 | 4.4 | 3.9 | 5.6 | 5.0 | 4.4 | 3.9 |
| 2-1 | 4 | 4 | 2 | 1 | 60 | 72 | 62 | 50 |
| 2-2 | 3 | 2 | 1 | 1 | 72 | 83 | 64 | 52 |
| 2-3 | 3 | 3 | 4 | 2 | 74 | 79 | 58 | 50 |
| 2-4 | 2 | 2 | 1 | 1 | 68 | 88 | 70 | 62 |
| 2-5 | 2 | 2 | 1 | 1 | 71 | 84 | 65 | 66 |
| 2-6 | 1 | 1 | 0 | 0 | 90 | 90 | 80 | 83 |
| 2-7 | 1 | 1 | 0 | 0 | 87 | 88 | 80 | 60 |
| 2-8 | 1 | 0 | 0 | 0 | 92 | 96 | 89 | 74 |

The samples with the greater content of lime consistently acquired a harder set; a pH value of 5.0 was optimum for hardness; and the greater amount of chicken meal increased the hardness. The optimum values for viscosity are 1.6 percent lime, 5.6 pH, and lower chicken meal and whey contents.

EXAMPLE 3

A series of experiments is performed with sucrose as the sugar source. The amount of meat meal is varied, and in one experiment, substituted entirely with yeast. The following formulations are prepared:

TABLE 13

| Ingredient | 3-1 | 3-2 | 3-3 | 3-4 | 3-5 | 3-6 | 3-7 | 3-8 |
|---|---|---|---|---|---|---|---|---|
| Lime, hyd (25%) | 80 gm | 40 | 40 | 40 | 40 | 40 | 40 | 50 |
| Water | 320 gm | 160 | 160 | 120 | 160 | 160 | 160 | 180 |
| Chicken Meal | — | 75 | 100 | 125 | 150 | 125 | 125 | 125 |
| Sucrose | 200 gm | 100 | 100 | 100 | 100 | 125 | 75 | 100 |
| Glycol | — | — | — | 40 | — | — | — | — |
| Yeast | 250 gm | 50 | 25 | — | — | — | — | — |
| Phosphoric Acid | 40 gm | 20 | 20 | 20 | 20 | 20 | 20 | 20 |
| Total | 890 gm | 445 | 445 | 495 | 445 | 470 | 420 | 475 |

The hardness of the products are determined 24 hours after their preparation and the following results are obtained:

TABLE 14

| Ingredient | 3-1 | 3-2 | 3-3 | 3-4 | 3-5 | 3-6 | 3-7 | 3-8 |
|---|---|---|---|---|---|---|---|---|
| Hardness | 25 | 53 | 42 | 64 | 62 | 52 | 51 | 47 |

The solid which was prepared from sucrose is softer than the solids prepared using whey as the sugar source. Yeast can be substituted for chicken meal, however, the resultant solid is softer than that produced entirely from chicken meal.

Increasing the concentration of the chicken meal increases the hardness of the solid products.

EXAMPLE 4

Acetic acid was substituted for phosphoric acid and the following formulation was prepared:

TABLE 15

| Ingredient | 4-1 |
|---|---|
| Water | 17 ml |
| Calcium hydroxide* | 24 gm |
| Chicken Meal | 75 gm |
| Inverted Whey | 150 gm |
| Acetic Acid | 11 gm |

The pH values of the final product was slightly higher for acetic acid formulation compared to that for the phosphoric acid. The hardness of the product was comparable to that prepared with phosphoric acid.

EXAMPLE 5

A series of experiments were conducted to evaluate other protein sources. The following table summarizes the formulations which were tested and the results:

TABLE 16

| Ingredients Description: | 5-1 Control | 5-2 Blood meal | 5-3 corn gluten | 5-4 grape pomice | 5-5 cotton- seed meal | 5-6 soy meal |
|---|---|---|---|---|---|---|
| Water | 17 | 17 | 17 | 17 | 17 | 17 |
| Ca(OH)$_2$ | 24 | 24 | 24 | 24 | 24 | 24 |
| Glycol | 21 | 21 | 21 | 21 | 21 | 21 |
| Inverted Whey | 150 | 150 | 150 | 150 | 150 | 150 |
| Chicken meal | 75 | — | — | — | — | — |
| Blood meal | — | 75 | — | — | — | — |
| Corn gluten meal | — | — | 75 | — | — | — |
| Grape pumice | — | — | — | 75 | — | — |
| Cottonseed meal | — | — | — | — | 75 | — |
| Soy meal | — | — | — | — | — | 75 |
| H$_3$PO$_4$ | 11 | 14 | 14 | 14 | 14 | 14 |
| Hardness | 40 | liquid | 17 | 18 | 42 | 52 |

These experiments demonstrate that soy meal and cottonseed meal can be directly substituted as the protein source for meat meals without adversely affecting the physical appearance and properties of the product.

EXAMPLE 6

In this experiment, the blood meal protein source which failed to provide a solid in Example 5 was used with the addition of 1.5 weight percent gelatin. The same procedure and quantities of other ingredients were used and the product was a soft and moist solid having a sufficient hardness to provide an acceptable soft and moist product.

Substantially the same results can be obtained from the corn gluten meal and the grape pomice by the addition of from 1 to about 2 percent gelatin before using these protein sources in the method.

EXAMPLE 7

This illustrates the preparation of a drug containing pet food. The pet food is intended for application to treat and control intestinal tapeworm in adult dogs and an anthelmintic drug is selected such as arecoline acetarsol which has a recommended daily dosage of 22 milligrams for each 10 pounds of body weight.

The drug is a powdered dry solid and is added to a pet food having the formula of Example 1A, Table 5. The drug is added to this pet food at a concentration of 0.24 weight percent and is added as the last ingredient. The liquid mix, prior to solidification, is poured into wax-coated cardboard cartons at 10 pounds net weight per carton and wax-coated cardboard dividers at 5×4 spacing are inserted into each carton, subdividing its contents into 20 small cubes, each weighing 227 grams. The resultant pet food is intended for feeding medium weight dogs from about 25 to 75 pounds body weight at the following daily rations:

TABLE 17

| Animal Body Weight | Number of Cubes Daily |
|---|---|
| 25 | 1 |
| 50 | 2 |
| 75 | 3 |

Similar packaging can be provided for small dogs, however, the drug concentration is reduced slightly to 0.16 weight percent. The liquid mix is poured into one pound wax-coated cardboard boxes and a wax-coated divider at a 5×2 spacing is inserted in each box to divide its contents into 10 small cubes, each weighing 45 grams. The resultant pet food is intended for feeding small dogs at the following daily ration:

TABLE 18

| Dog body weight | Number of cubes daily |
|---|---|
| 5 | 1½ |
| 10 | 3 |
| 15 | 4½ |

The pet owner is provided with feeding directions including a caution not to exceed the recommended daily ration provided by feeding tables similar to the above Tables 17 and 18 and to use a non-medicated pet food to supplement the ration, if necessary. The wax coatings on the cartons and dividers readily permit the pet food cubes to separate and be removed from the boxes.

The invention has been described with reference to the presently preferred embodiments. It is not intended that the invention be limited by this illustration of the presently preferred embodiment. Instead, it is intended that the invention be defined by the ingredients, steps, and their obvious equivalents set forth in the following claims.

What is claimed is:

1. A shelf-stable, soft, moist thermoplastic pet food consisting essentially of:
   (a) water from 25 to about 50 weight percent;
   (b) a proteinaceous meal selected from the class consisting of plant and animal meals containing at least about 25 weight percent protein and present in an amount from 12 to about 35 weight percent;

(c) a sugar selected from the group consisting essentially of dry sugar and aqueous syrups containing from 50 to 95 percent of sucrose, glucose, lactose, galactose, fructose or mixtures thereof and present in an amount from 12 to about 35 weight percent;

(d) an alkaline earth metal, mixed with ingredients (a) (b) and (c) as the hydroxide in an amount from about 1 to about 5 weight percent, expressed as the oxide; and (e) an acid selected from the group consisting of phosphoric and $C_2$ to about $C_{12}$ alkanoic acids in an amount from about 2 to about 6 weight percent, sufficient to impart a pH value to said pet food from 3.5 to about 6;

said pet food prepared by mixing said proteinaceous meal and sugar with the aqueous hydroxide of the alkaline earth metal sufficiently to form a viscous sol, neutralizing the viscous sol with said acid, and permitting it to solidify into a soft, moist thermoplastic gel.

2. The soft, moist pet food of claim 1 wherein said proteinaceous meal is a meat meal.

3. The soft, moist pet food of claim 2 wherein said meal is chicken meal.

4. The soft, moist pet food of claim 1 wherein said proteinaceous meal is soy meal.

5. The soft, moist pet food of claim 1 wherein said proteinaceous meal is cottonseed meal.

6. The soft, moist pet food of claim 1 wherein said sugar is lactose and is obtained from whey.

7. The soft moist pet food of claim 1 wherein said sugar is a mixture of sucrose and galactose and is obtained from the inversion of whey.

8. The soft moist pet food of claim 1 wherein said alkaline earth metal hydroxide is calcium hydroxide.

9. The soft, moist pet food of claim 1 wherein said acid is orthophosphoric acid.

10. The soft, moist pet food of claim 1 wherein said acid is acetic acid.

11. The soft, moist pet food of claim 1 including discrete cellulose fibers having lengths from about 1/16 to about ½ inch in an amount from about 0.1 to about 2.5 weight percent.

12. A method for the manufacture of a soft, moist pet food which comprises admixing a proteinaceous meal containing at least about 20 percent protein and a sugar selected from the class consisting of sucrose, glucose, lactose, fructose, galactose, and mixtures thereof, with an alkaline earth metal hydroxide in sufficient quantities to obtain a pH value from about 9.5 to 11.5 and in proportions of water from about 25 to about 35 weight percent, of proteinaceous meal from 12 to about 35 weight percent, and of sugar from 12 to about 35 weight percent; maintaining the mixture at a temperature from ambient to about 150 degrees F. while stirring and permitting the mixture to thicken to a viscosity between about 2000 and about 8000 centipoise seconds, thereafter neutralizing said mixture by the addition of an acid selected from the group consisting of phosphoric and $C_2$ to about $C_{12}$ alkanoic acids in a sufficient quantity to impart a pH value from 3.5 to about 6 to the resultant mixture; and permitting said mixture to solidify.

13. The method of claim 12 wherein said proteinaceous meal is a meat meal.

14. The method of claim 13 wherein said meal is chicken meal.

15. The method of claim 12 wherein said proteinaceous meal is soy meal.

16. The method of claim 12 wherein said proteinaceous meal is cottonseed meal.

17. The method of claim 12 wherein said sugar is lactose and is obtained from whey.

18. The method of claim 12 wherein said sugar is a mixture of sucrose and galactose and is obtained from the inversion of whey.

19. The method of claim 12 wherein said alkaline earth metal is calcium hydroxide.

20. The method of claim 12 wherein said acid is orthophosphoric acid.

21. The method of claim 12 wherein said acid is acetic acid.

22. The method of claim 12 including the addition of discrete cellulose fibers having lengths from about 1/16 to about ½ inch in an amount from about 0.1 to about 2.5 weight percent to said mixture.

23. The method of claim 12 wherein said resultant mixture is packaged in a carton with a plurality of waxed dividers subdividing the carton into a plurality of individual cubes, each cube corresponding to a daily ration for a pet and containing a daily dosage of a drug for the pet.

24. The method of claim 12 including the steps of heating the solidified mixture to a temperature between about 120° and 180° F., sufficient to soften the mixture and, extruding the softened mixture into strands.

25. The method of claim 24 including the step of blending red colorant into at least a portion of the softened mixture to simulate the appearance of red meat.

26. The method of claim 25 including the step of blending a white colorant into a second portion of the softened mixture to simulate fat meat portions, and blending the extruded portions contaning red and white colorants during said extrusion step.

* * * * *